(12) United States Patent
Miyashita et al.

(10) Patent No.: US 7,245,334 B2
(45) Date of Patent: Jul. 17, 2007

(54) ELECTRO-OPTICAL DEVICE ENCASED IN MOUNTING CASE, PROJECTION DISPLAY APPARATUS, AND MOUNTING CASE

(75) Inventors: Tomoaki Miyashita, Shimosuwa-machi (JP); Hiroyuki Kojima, Suwa (JP); Hiromi Saitoh, Chino-sho (JP)

(73) Assignee: Seiko Epson Corporation, Tokyo (JP)

( * ) Notice: Subject to any disclaimer, the term of this patent is extended or adjusted under 35 U.S.C. 154(b) by 52 days.

(21) Appl. No.: 10/819,117

(22) Filed: Apr. 7, 2004

(65) Prior Publication Data

US 2004/0252253 A1 Dec. 16, 2004

(30) Foreign Application Priority Data

Apr. 22, 2003 (JP) ............... 2003-117167

(51) Int. Cl.
*G02F 1/1333* (2006.01)
(52) U.S. Cl. ............. 349/58; 349/60; 359/322; 361/681
(58) Field of Classification Search ............. 349/5, 349/58–60; 359/322; 361/681
See application file for complete search history.

(56) References Cited

U.S. PATENT DOCUMENTS

| | | | | |
|---|---|---|---|---|
| 5,880,795 | A * | 3/1999 | Nagata et al. | 349/58 |
| 6,056,407 | A * | 5/2000 | Iinuma et al. | 353/119 |
| 6,057,902 | A * | 5/2000 | Angelopoulos et al. | 349/129 |
| 6,292,239 | B1 * | 9/2001 | Nagamura et al. | 349/58 |
| 6,406,151 | B1 * | 6/2002 | Fujimori | 353/119 |
| 6,587,167 | B1 | 7/2003 | Fujimori et al. | |
| 6,950,308 | B2 * | 9/2005 | Saitoh et al. | 361/704 |
| 2002/0114577 | A1 | 8/2002 | Kondo et al. | |
| 2002/0167637 | A1 | 11/2002 | Burke et al. | |

FOREIGN PATENT DOCUMENTS

| | | |
|---|---|---|
| JP | A 11-064860 | 3/1999 |
| JP | A 2000-019979 | 1/2000 |
| JP | A 2000-098329 | 4/2000 |
| JP | A 2000-221588 | 8/2000 |
| JP | A 2000-258859 | 9/2000 |
| JP | A 2000-305174 | 11/2000 |
| JP | A 2000-347168 | 12/2000 |
| JP | A 2001-183628 | 7/2001 |
| JP | A 2001-195006 | 7/2001 |
| JP | A 2002-107698 | 4/2002 |
| JP | A 2002-229121 | 8/2002 |
| JP | A 2002-366046 | 12/2002 |
| JP | A 2004-045680 | 2/2004 |
| WO | A1 WO98/36313 | 8/1998 |

* cited by examiner

*Primary Examiner*—Huyen Ngo
(74) *Attorney, Agent, or Firm*—Oliff & Berridge, PLC

(57) ABSTRACT

The invention provides an electro-optical device that displays high quality images regardless of temperature circumstances of the surroundings. The electro-optical device can be encased in a mounting case which accommodates a liquid crystal panel in which projection light is incident on an image display region from a light source. The mounting case can include a plate arranged so as to face one surface of the liquid crystal panel, a cover arranged so as to cover the plate and the liquid crystal panel, an adhesive for attaching the plate to the liquid crystal panel, and adhesive pockets provided in at least one of the plate and the cover, for accommodating the adhesive.

8 Claims, 8 Drawing Sheets

ELECTRO-OPTICAL DEVICE ENCASED IN MOUNTING CASE, PROJECTION DISPLAY APPARATUS, AND MOUNTING CASE

BACKGROUND OF THE INVENTION

1. Technical Field of Invention

The present invention relates to a mounting case for accommodating an electro-optical device such as a liquid crystal panel, which is used as a light valve for a projection display apparatus such as a liquid crystal projector, an electro-optical device encased in a mounting case, in which the electro-optical device is accommodated or encased, and a projection display apparatus comprising the electro-optical device encased in the mounting case.

2. Description of Related Art

In general, when a liquid crystal panel is used as a light valve of a liquid crystal projector, the liquid crystal panel is not provided in an exposed state on a console, etc., constituting the liquid crystal projector, but it is accommodated or encased in a suitable mounting case, and then the mounting case including the liquid crystal panel is provided on the console. This is because the liquid crystal panel can easily be fixed to the console, etc. by suitably providing screw holes or the like in the mounting case.

In the liquid crystal projector, the light emitted from a light source is projected onto the liquid crystal panel encased in the mounting case as focused light. Light passing through the liquid crystal panel is enlarged and projected on a screen to display images. In such a liquid crystal projector, since the enlarged projection is generally predetermined, relatively intense light emitted from a light source, such as a metal halide lamp, is used.

However, in this construction, first, there is a problem in that the temperature of the liquid-crystal-panel encasing mounting case, and particularly of the liquid crystal panel rises. The rise in temperature causes a rise in temperature of the liquid crystal interposed between a pair of transparent substrates in the liquid crystal panel. Therefore, the characteristics of the liquid crystal are deteriorated. In addition, when the light emitted from the source light is uneven, the liquid crystal panel is partially heated, and then variations in the transmittance are generated at so-called hot spots. Thus, the quality of projected images deteriorates.

The technique for preventing the rise in temperature of the liquid crystal panel includes, for example, one disclosed in the International Publication Number WO98/36313, etc. In this patent, disclosed is a technique to prevent the rise in temperature of the liquid crystal panel by providing a heat radiating sheet between a liquid crystal panel and a heat radiating plate in a liquid crystal display module which includes the liquid crystal panel, a case (correspond to a mounting case in this specification) holding and accommodating the liquid crystal panel therein and provided with the heat radiating plate.

In addition, in order to solve the above problems, other approaches, such as an approach of providing a light shielding film on a substrate positioned at the side of the liquid crystal panel on which light is incident and an approach of forming the mounting case, in which the liquid crystal panel is held or accommodated, using a light reflective material, have been known.

SUMMARY OF THE INVENTION

However, the conventional approaches for preventing the rise in temperature of the liquid crystal panel have the following problems. As long as intense light is emitted from the light source, the problem of the rise in temperature of the liquid crystal panel may occur at any time. Therefore, in order to obtain still higher image quality, the more effective measures to prevent the rise in temperature are required instead of or in addition to the aforementioned approaches.

According to the aforementioned liquid crystal panel encased in the mounting case, not only the rise in the temperature of the liquid crystal panel, but also the relationship between the liquid crystal panel and the mounting case matters. In other words, the transparent substrate that constitutes the liquid crystal panel is made of a material having a relatively small linear expansion coefficient, such as quartz glass, and neoceram, but the mounting case is made of a material having a relatively large linear expansion coefficient such as a metal. Therefore, although the same light (energy) is radiated onto the transparent substrate and the mounting case, the mounting case may expand more than the transparent substrate. As a result, the liquid crystal panel to be accommodated in the mounting case in a predetermined position may have dislocation in position in accordance with the expansion of the mounting case. Therefore, since the liquid crystal panel deviates from the light collecting point of a light source, it is difficult to correctly perform enlarged projection light onto a screen. When the accumulated heat is exhausted from the liquid crystal panel encased in the mounting case, to the contrary, the mounting case may expand more than the transparent substrate.

Then, since the mounting case applies power to the liquid crystal panel, undesired internal stress may be generated in the liquid crystal panel or a cell gap between the transparent substrates may be partially narrowed. As a result, since spots are generated in images, it is difficult to display high quality images.

In order to solve the above problems, it is an object of the present invention to provide an electro-optical device encased in a mounting case, a projection type display device, and a mounting case, capable of displaying high quality images regardless of temperature circumstances of the surroundings.

In order to solve the above problems, a first electro-optical device encased in a mounting case according to the invention can be obtained by accommodating in a mounting case an electro-optical device having an image display region on which projection light from a light source is incident. The mounting case can include a plate disposed so as to face one surface of the electro-optical device, a cover disposed so as to cover the plate and the electro-optical device, an adhesive for attaching at least one of the plate and the cover to the electro-optical device, and adhesive pockets for accommodating the adhesive, which are provided in at least one of the plate and the cover.

According to the first electro-optical device encased in the mounting case of the invention, the electro-optical device having the image display region on which the projection light from the light source is incident, is accommodated in the mounting case comprising the plate and the cover. The electro-optical device can include, for example, a liquid crystal device or a liquid crystal panel that is mounted as a light valve of a projection display apparatus. In addition, the mounting case may have an additional function such as a light shielding function for preventing the leakage of light in the peripheral region of the electro-optical device and the entrance of the stray light from the peripheral region into the image display region by at least partially covering a portion of the peripheral region of the electro-optical device.

According to the invention, in particular, adhesive pockets for accommodating the adhesive are provided in at least one of the plate and the cover (hereinafter, represented as 'the plate'). The amount of the adhesive for adhering the plate to the electro-optical device is preferably determined by the sizes and the volumes of the adhesive pockets. Therefore, it is possible to relatively precisely define the amount.

Therefore, according to the invention, it is possible to prevent the adhesive from being wasted. When the sizes and the volumes of the adhesive pockets are appropriate, it is possible to firmly attach the plate to the electro-optical device only by coating the internal portions of the adhesive pockets with the adhesive. Therefore, according to the invention, there is very little possibility that the dislocation in position of the electro-optical device in the mounting case occurs due to the rise in temperature of the electro-optical device encased in the mounting case.

The specific forms of the adhesive pockets according to the present invention are various. For example, it is possible to form concave portions, fences, or banks by performing a press process on a part of the plate. Furthermore, the concave portions, the fences, or the banks are preferably formed so that the electro-optical device can contact the adhesive filled in the concave portions, the fences, or the banks.

In order to solve the above problems, a second electro-optical device encased in a mounting case according to the invention can be obtained by accommodating in a mounting case an electro-optical device having an image display region on which projection light from a light source is incident. The mounting case can include a plate disposed so as to face one surface of the electro-optical device, a cover disposed so as to cover the plate and the electro-optical device, first engaging portions provided in the plate, and second engaging portions provided in the cover and capable of being engaged with the first engaging portions. The relative position of the cover with respect to the plate and the electro-optical device is held by the second engaging portions engaged with the first engaging portions, and the cover can expand an contract excluding the second engaging portions engaged with the first engaging portions.

The second electro-optical device encased in a mounting case can be used as a light valve of a projection type display device like the first electro-optical device encased in the mounting case according to the present invention.

According to the invention, in particular, the first engaging portions are provided in the plate. The second engaging portions that can be engaged with the first engaging portions are provided in the cover. The relative position of the cover with respect to the plate and the electro-optical device is held by the second engaging portions engaged with the first engaging portions. To be specific, the position of the cover with respect to the plate and the electro-optical device is determined in the portion (more preferably, only in the corresponding portion) where the second engaging portions and the first engaging portions are engaged with each other. In the other portions, the cover can freely expand or contract. In other words, the cover can expand and contract excluding the second engaging portions engaged with the first engaging portions.

Therefore, the thermal expansion of the cover, which occurs when the projection light incident onto the electro-optical device encased in the mounting case results in the rise in temperature of the cover or when transmission of heat from the electro-optical device results in the rise in temperature of the cover, can be freely performed without any restriction. Also, the contraction of the cover, which occurs when the cover is cooled after the temperature thereof has risen, can be relatively freely performed.

Therefore, according to the invention, it is possible to prevent the dislocation in position of the electro-optical device in the mounting case due to the expansion of the cover and to prevent color irregularity in images due to power applied to the electro-optical device by the contraction of the cover.

In another aspect of the electro-optical device encased in the mounting case according to the invention, the first engaging portions are also used as adhesive pockets for accommodating an adhesive for attaching the plate to the electro-optical device. According to this aspect, since the adhesive pockets are included, it is possible to achieve the same advantages of the first electro-optical device encased in the mounting case according to the present invention. That is, since it is possible to prevent the adhesive from being wasted and to firmly attach the plate to the electro-optical device due to the presences of the adhesive pockets, there is very little possibility that the dislocation in position of the electro-optical device in the mounting case occurs.

According to the present aspect, in particular, the adhesive pockets are used as the first engaging portions. Therefore, it is possible to simplify the structure of the electro-optical device compared with a structure in which the adhesive pockets and the first engaging portions are separately provided. Also, in this case, it is possible to achieve the advantages of the adhesive pockets and the advantages (that is, the advantages of the free transformation of the cover) of the mounting case in which the first engaging portions and the second engaging portion are engaged.

In the aspect of including the adhesive pockets, the plate can have a plate shaped member that is quadrangular in plan view and bent portions which are formed by bending parts of opposing two sides, among the sides that constitute the quadrangular plate shaped member, toward the inside of the quadrangle, and the adhesive pockets are formed by parts of the bent portion protruding outward the quadrangle.

According to this aspect, it is possible to suitably form the adhesive pockets. That is, the adhesive pockets according to the present aspect are formed by the outwardly protruding parts of the bent portions obtained by bending parts of the plate shaped member. In this case, the internal portions of the protruding portions correspond to the pockets. When the electro-optical device is mounted so as to contact the surface of the plate shaped member, the bent portions exist on both sides of the electro-optical device. The internal portions of the protruding portions, that is, the pockets face both surfaces of the electro-optical device. Therefore, when the adhesive is filled in the pockets, it is possible to attach the plate to the electro-optical device. The amount of the adhesive to be used is determined by the degree to which parts of the bent portions protrude and the height of the bent portions.

That the present structure can include the quadrangular plate shaped member means that the plate shaped member that constitutes the plate is not only quadrangular in the strict sense of the word (for example, square, rectangular, etc.), but also modifications from the strict quadrangular shape. For example, since the press process is performed on the plate shaped member, the plate shaped member may have an appropriate three-dimensional shape. In addition to the above-mentioned forms, various modifications may be conceived. The present structure includes all of the modifications. In short, it is suffice that the plate shaped member conceptually includes the quadrangular shape having two opposing sides in plan view.

According to this aspect, two protruding portions are provided in each of the bent portions. The second engaging portions may be arranged to be engaged between the protruding portions in each of the bent portions.

According to the above construction, two protruding portions are provided in each of the bent portions. It is noted that, as mentioned above, since the bent portions are formed by bending parts of two opposing sides, among the sides constituting the quadrangular plate shaped member, toward the inside of the quadrangular plate shaped member, at least two bent portions are provided in one plate. Therefore, at least four protruding portions are provided. As a result, in this aspect, each of the second engaging portions is engaged between the protruding portions with respect to each of the bent portions.

According to the present aspect, a specific aspect suitable for a case in which the first engaging portions are also used as the adhesive pockets is provided. That is, in this case, the internal portions of the protruding portions constitute the adhesive pockets and the external portions constitute the first engaging portions. According to the present aspect, it is realized that the second engaging portions are engaged between the protruding portions that are the first engaging portions. Therefore, the relatively freely expansion and contraction of the cover can be preferably realized. In particular, in this case, the cover exists outside the bent portion, seen from the electro-optical device, to thus relatively reduce the direct contact between the cover and the electro-optical device. Therefore, it is possible to obtain the above-mentioned effects more efficiently.

Further, in the aspect of comprising the adhesive pockets, the adhesive may comprise a photo-curing resin. According to this aspect, it is possible to relatively firmly attach the plate to the electro-optical device.

A first mounting case according to the invention accommodates an electro-optical device having an image display region on which projection light from a light source is incident, and can include a plate disposed so as to face one surface of the electro-optical device, a cover disposed so as to cover the plate and the electro-optical device, an adhesive for attaching the plate to the electro-optical device, and adhesive pockets for accommodating the adhesive, which are provided in at least one of the plate and the cover. The first mounting case according to the invention can be suitably used as the mounting case constituting the above first electro-optical device encased in the mounting case according to the present invention.

A second mounting case according to the invention accommodates an electro-optical device having an image display region on which projection light from a light source is incident, and can include a plate disposed so as to face one surface of the electro-optical device, a cover disposed so as to cover the plate and the electro-optical device, first engaging portions provided in the plate, and second engaging portions provided in the cover and capable of being engaged with the first engaging portions, the relative position of the cover with respect to the plate and the electro-optical device is held by the second engaging portions engaged with the first engaging portions.

The second mounting case according to the invention can be suitably used as the mounting case constituting the above second electro-optical device encased in the mounting case according to the present invention.

In order to solve the above problems, a projection display apparatus according to the invention can include the electro-optical device encased in the mounting case, a light source, an optical system for guiding the projection light onto the electro-optical device, and a projection optical system for projecting the projection light emitted from the electro-optical device.

According to the projection type display device of the invention, since it can include the electro-optical device encased in the first or second mounting case according to the present invention, it is possible to prevent the position of the electro-optical device from deviating in the mounting case and to prevent undesired power from being applied to the electro-optical device due to the change in the temperature of the electro-optical device encased in the mounting case. As a result, it is possible to display high quality images.

The effects and other advantages of the present invention will be apparent from the embodiments described below.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Now, embodiments of the present invention will be described with reference to the accompanying drawings.

Firstly, with reference to FIG. 1, an embodiment of a liquid crystal projection apparatus according to the invention will be described on the basis of an optical system into which optical units are assembled. The projection display apparatus of the embodiment is constructed as a multi-panel color projector including three liquid light valves, an example of an electro-optical device encased in a mounting case.

Figure 1:
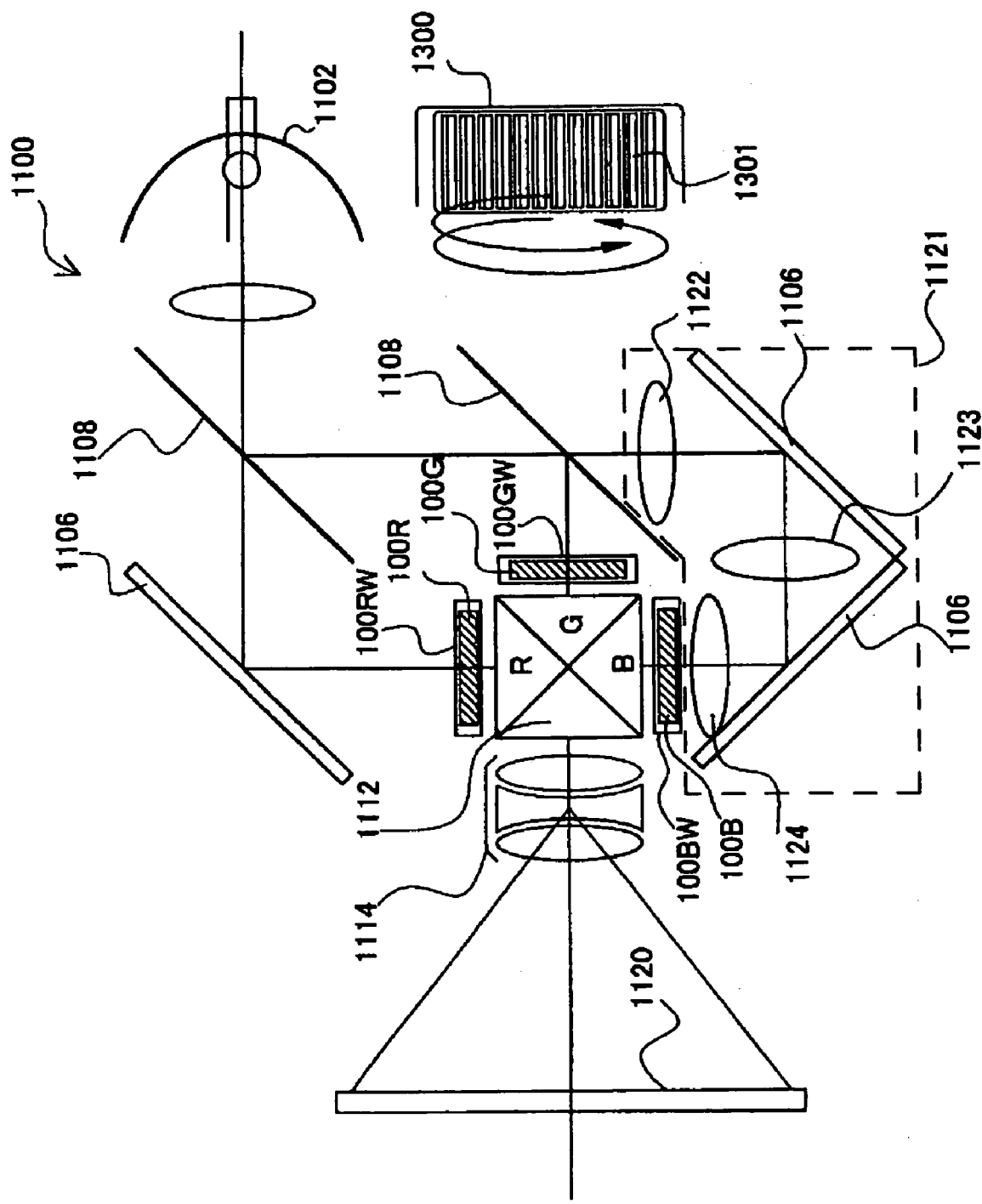
FIG. 1 is a plan view illustrating a liquid crystal projection apparatus according to an embodiment of the present invention.

In FIG. 1, a liquid crystal projector 1100, an example of the multi-panel color projector according to the embodiment, is a projector which utilizes three liquid crystal light valves each having an electro-optical device in which driving circuit is mounted on a TFT array substrate, as RGB light valves 100R, 100G, and 100B.

In the liquid crystal projector 1100, the light emitted from a lamp unit 1102, which is a white light source, such as a metal halide lamp, is divided into R, G, and B light components corresponding to three primary colors R, G, and B by three mirrors 1106 and two dichroic mirrors 1108, and the light components are guided into the light valves 100R, 100G, and 100B corresponding to the colors. In particular, the B light component is guided through a relay lens system 1121 including an incident lens 1122, a relay lens 1123, and an emitting lens 1124 in order to prevent the loss of light due to its long optical path. The light components corresponding to the three primary colors, which are modulated by the light valves 100R, 100G, and 100B, are synthesized by a dichroic prism 1112 and then projected on a screen 1120 as a color image through a projection lens 1114.

Active matrix drive liquid crystal devices, in which TFTs are used as switching devices, are used as the light valves 100R, 100G, and 100B of the embodiment. The light valves 100R, 100G, and 100B are each configures as an electro-optical device encased in a mounting case as described later in detail.

Further, as shown in FIG. 1, a sirocco fan 1300 for sending cooling air to the light valves 100R, 100G, and 100B is provided in the liquid crystal projector 1100. The sirocco fan 1300 comprises a substantially cylindrical member having a plurality of blades 1301 on the side thereof, and rotating the cylindrical member rotates with its axis as a center to cause the blades 1301 to generate wind. Incidentally, the wind generated by the sirocco fan 1300 in accordance with such a principle flows in whirls, as shown in FIG. 1.

The wind is supplied to the respective light valves 100R, 100G, and 100B through air passages not shown in FIG. 1, and blows out from respective outlets 100RW, 100GW, and 100BW provided near the light valves 100R, 100G, and 100B to the light valves 100R, 100G, and 100B.

Incidentally, if the sirocco fan 1300 as described above is used, it is possible to obtain an advantage that the wind is easily supplied to narrow spaces around the light valves 100R, 100G, and 100B because the wind has a high static pressure.

In the aforementioned construction, the light emitted from the lamp unit 1102, which is an intense light source, raises the temperature of the light valves 100R, 100G, and 100B. At that time, if the temperature rises excessively, the liquid crystal constituting the light valves 100R, 100G, and 100B may be deteriorated, or hot spots generated by the partial heating of portions of the liquid crystal panels due to uneven light emitted from the light source may cause variations in the transmittance. For this reason, particularly, in the embodiment, mounting cases capable of cooling the electro-optical devices are provided in the respective light valves 100R, 100G, and 100B, as described later. Therefore, it is possible to effectively suppress the rise in temperature of the light valves 100R, 100G, and 100B, as described in greater detail below.

In the embodiment, it is preferable that cooling device including a circulating unit for flowing a coolant in the spaces surrounding the light valves 100R, 100G, and 100B is provided within a housing of the liquid crystal projector 1100. In this way, it is possible to further effectively release heat from the electro-optical device encased in the mounting case, which has a heat radiating function, as described later.

Figure 2:
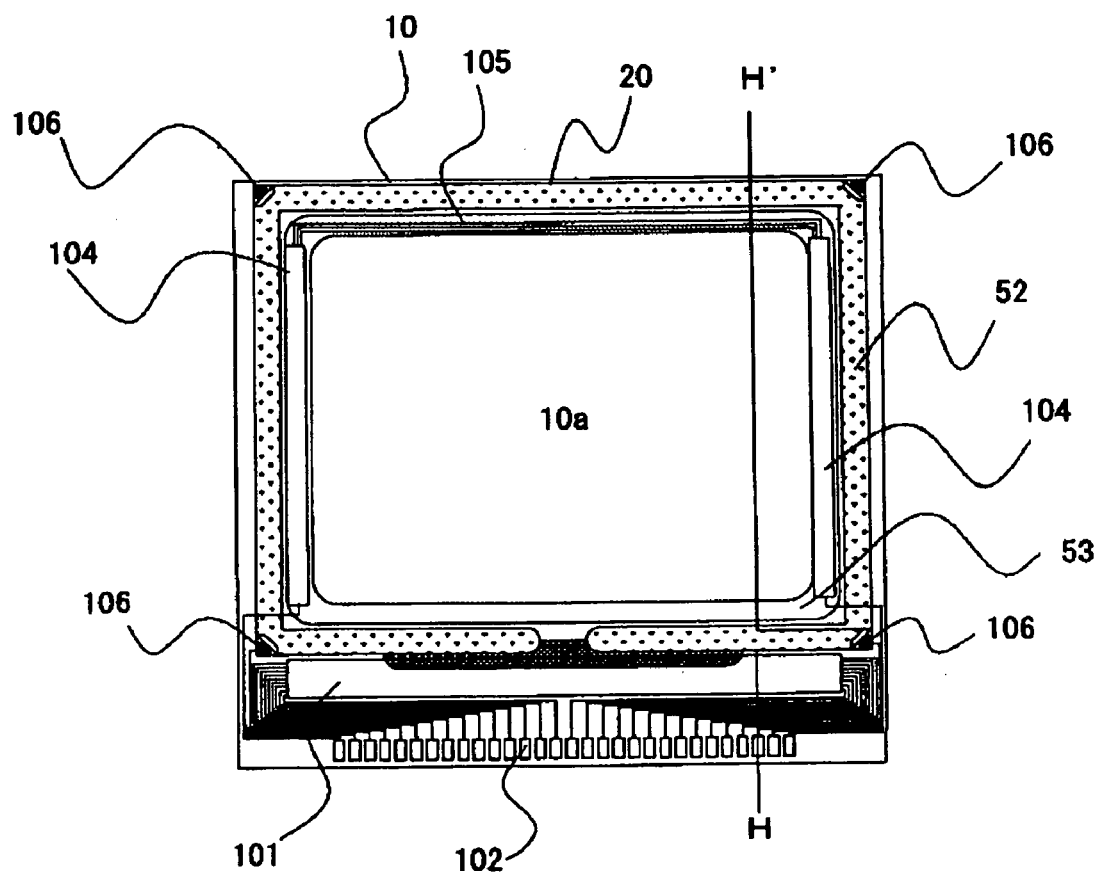
FIG. 2 is a plan view illustrating an electro-optical device according to an embodiment of the present invention.
Figure 3:
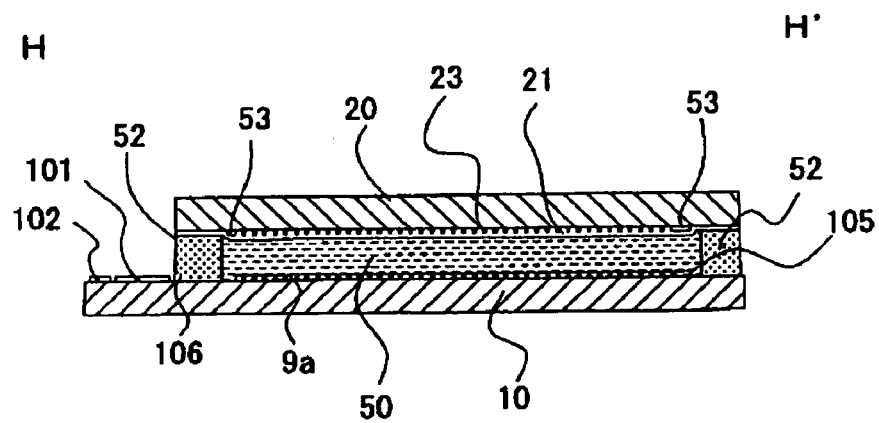
FIG. 3 is a cross-sectional view taken along the line H–H' in FIG. 2.

Next, the overall construction of an electro-optical apparatus according to an embodiment of the invention will be described with reference to FIGS. 2 and 3. Herein, TFT active drive liquid crystal device with a built-in driving circuit is illustrated as an example of an electro-optical device. The electro-optical device according to the embodiment is used as the liquid light valves 100R, 100G, and 100B of the aforementioned liquid crystal projector 1100. Herein, FIG. 2 is a plan view of the electro-optical device and illustrates a TFT array substrate and constructional components provided thereon as seen from the counter substrate side. FIG. 3 is a cross-sectional view taken along the line H-H' shown in FIG. 2.

Referring to FIGS. 2 and 3, in the electro-optical device according to the embodiment, the TFT array substrate 10 is disposed to face the counter substrate 20. A liquid crystal layer 50 is sealed between the TFT array substrate 10 and the counter substrate 20. The TFT array substrate 10 and the counter substrate 20 are bonded to each other by a seal member 52 disposed at a seal region which is located around an image display region 10a.

The seal member 52 for bonding the both substrates is made of, for example, ultraviolet curable resin, thermosetting resin, or the like, which is applied on the TFT array substrate 10 and then cured by ultraviolet ray irradiation or heating in manufacturing processes. In addition, spacers made of a material, such as glass fiber or glass bead, are dispersed in the seal member 52 to keep the gap between the TFT array substrate 10 and the counter substrate 20 (the gap between the substrates) at a predetermined interval. Therefore, the electro-optical device of the embodiment is used for a light valve of a projector as a small-sized device and is suitable for enlarging and displaying images.

A frame light shielding film 53 for defining a frame region of the image display region 10a is provided on the counter substrate 20 parallel to the inner side of the seal region where the seal member 52 is disposed. However, all or part of the frame light shielding film 53 may be provided on the TFT array substrate 10 as a built-in light shielding film.

Out of the regions extending around the image display region, in the peripheral region located at the outer side of the seal region where the seal member 52 is disposed, a data line driving circuit 101 and an external circuit connection terminal 102 are provided along one side of the TFT array substrate 10, and scanning line driving circuits 104 are provided along two sides adjacent to the one side so as to be covered with the frame light shielding film 53. In order to connect the two scanning line driving circuits 104 provided along the two sides of the image display region 10a to each other, a plurality of wiring lines 105 are provided along the remaining one side of the TFT array substrate 10 so as to be covered with the frame light shielding film 53.

Further, upper and lower conducting members 106 for serving as upper and lower conduction terminals between the two substrates are disposed at four corners of the counter substrate 20. On the other hand, on the TFT array substrate 10, upper and lower conduction terminals are provided at the regions opposite to the corners. Through these members, the electrical conduction is made between the TFT array substrate 10 and the counter substrate 20.

In FIG. 3, TFTs for pixel switching and wiring lines, such as scanning lines and data lines, are formed on the TFT array substrate 10 to form pixel electrodes 9a, and then, an alignment layer which is not shown are formed on the pixel electrodes 9a. On the other hand, on the counter substrate 20, a counter electrode 21 and a light shielding film 23 of a lattice or stripe shape are provided, and in addition, an alignment layer which is not shown is formed on the uppermost portion thereof. A liquid crystal layer 50, which is made of, for example, one kind of nematic liquid crystal or a mixture of plural kinds of nematic liquid crystals, takes a predetermined alignment state between a pair of the alignment layers.

In addition to the data line driving circuit 101 and the scanning line driving circuits 104, etc., a sampling circuit for sampling image signals on image signal lines to supply to data lines, a precharge circuit for supplying the precharge signals of a predetermined level to a plurality of data lines prior to the image signals, and a test circuit for inspecting the quality and defects of the electro-optical device during the manufacturing process or at the time of forwarding may be formed on the TFT array substrate 10 shown in FIGS. 2 and 3, and the like.

Figure 4:
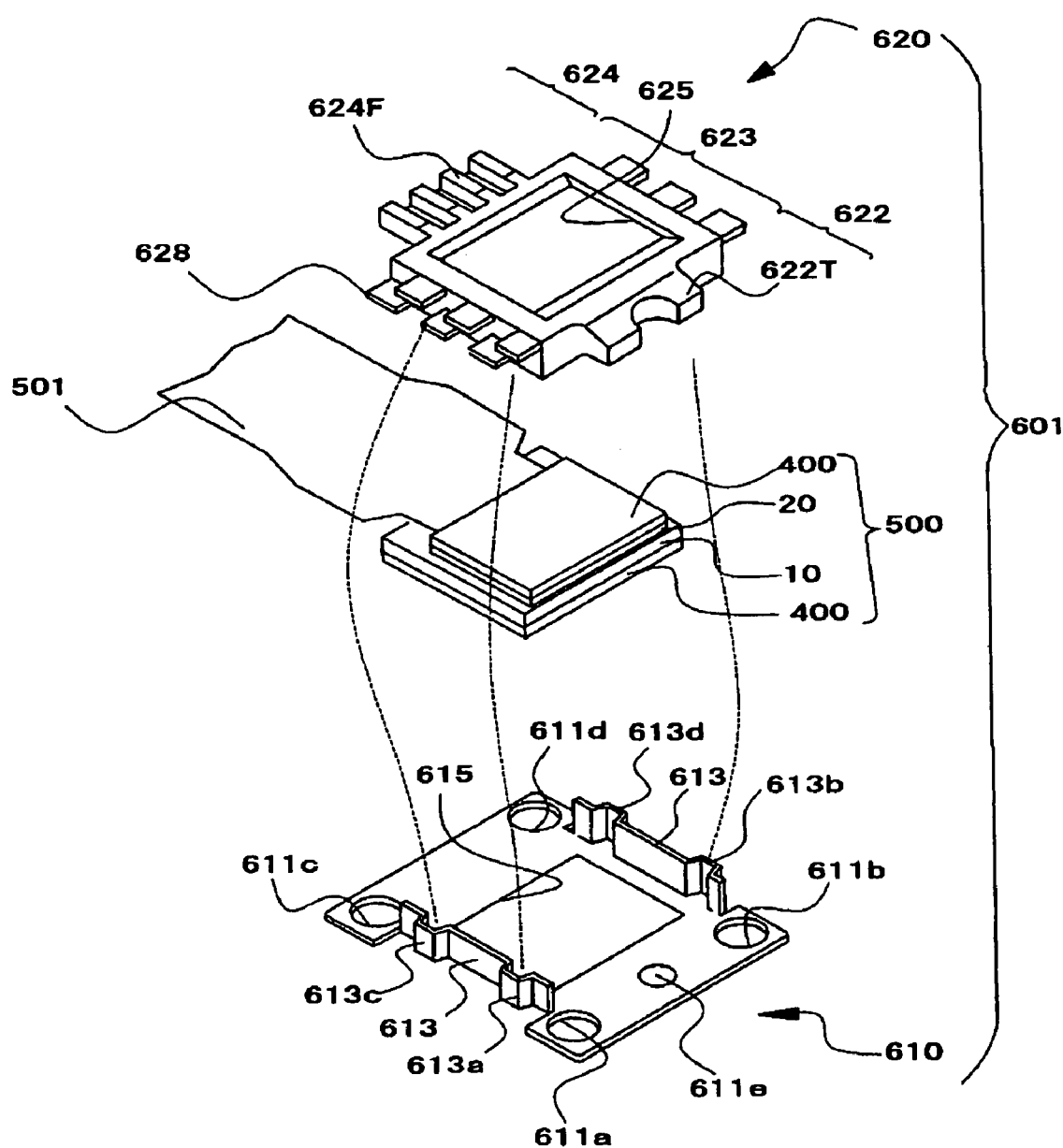
FIG. 4 is an exploded perspective view illustrating an electro-optical device together with a mounting case according to a first embodiment of the present invention.
Figure 5:
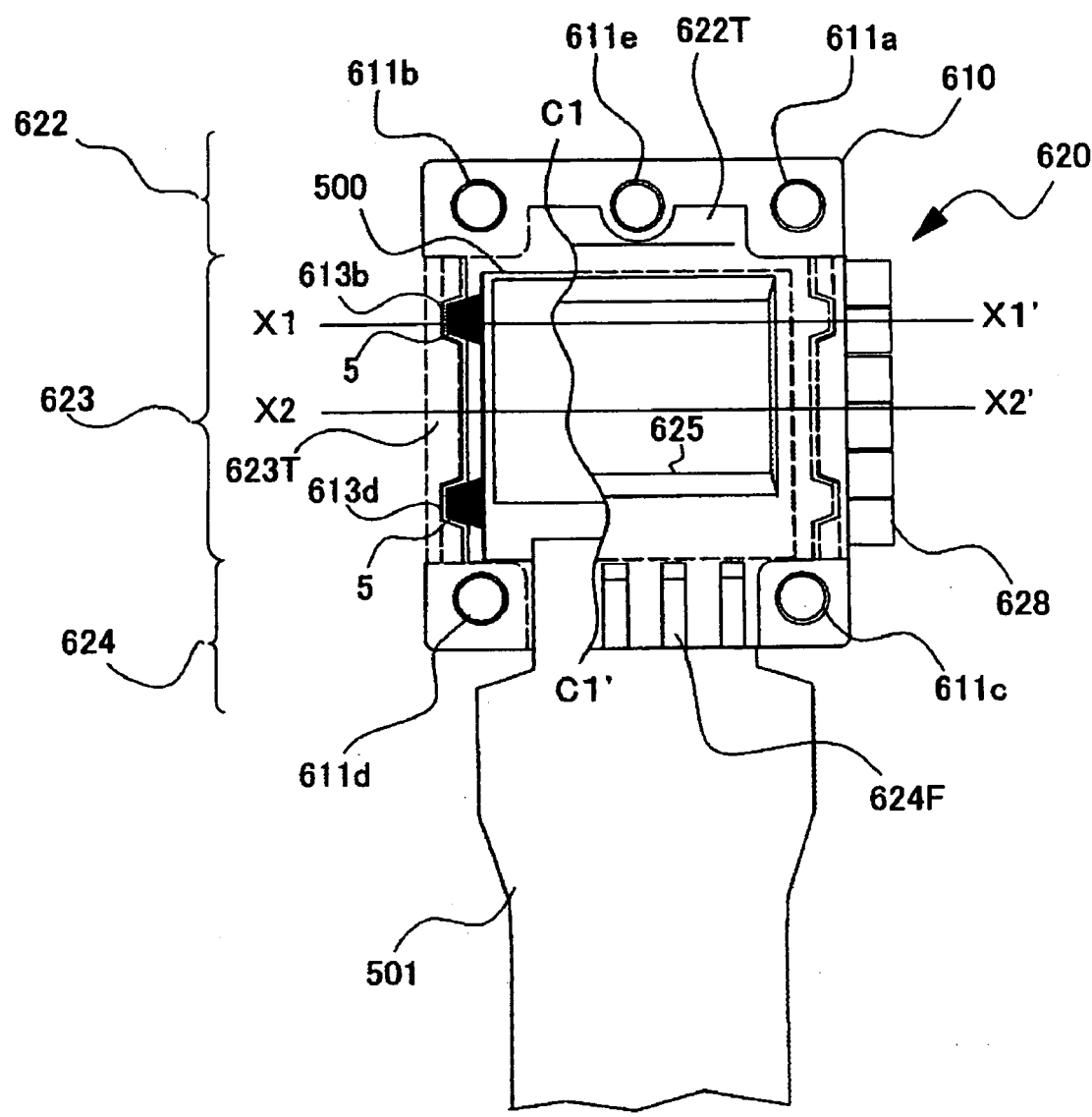
FIG. 5 is a front view of the electro-optical device encased in the mounting case according to the embodiment of the present invention.
Figure 6:
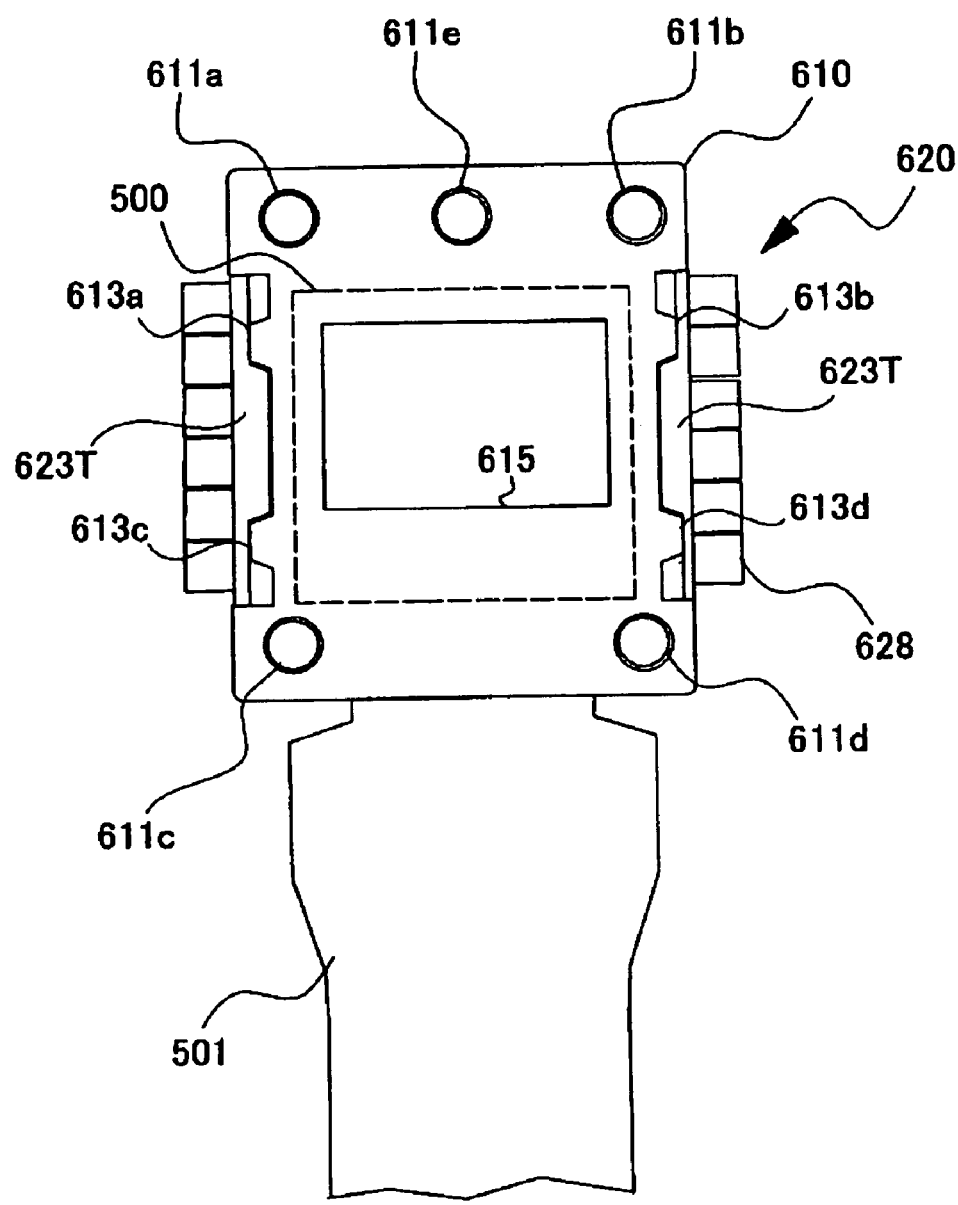
FIG. 6 is a rear view of the electro-optical device encased in the mounting case of FIG. 5.
Figure 7:
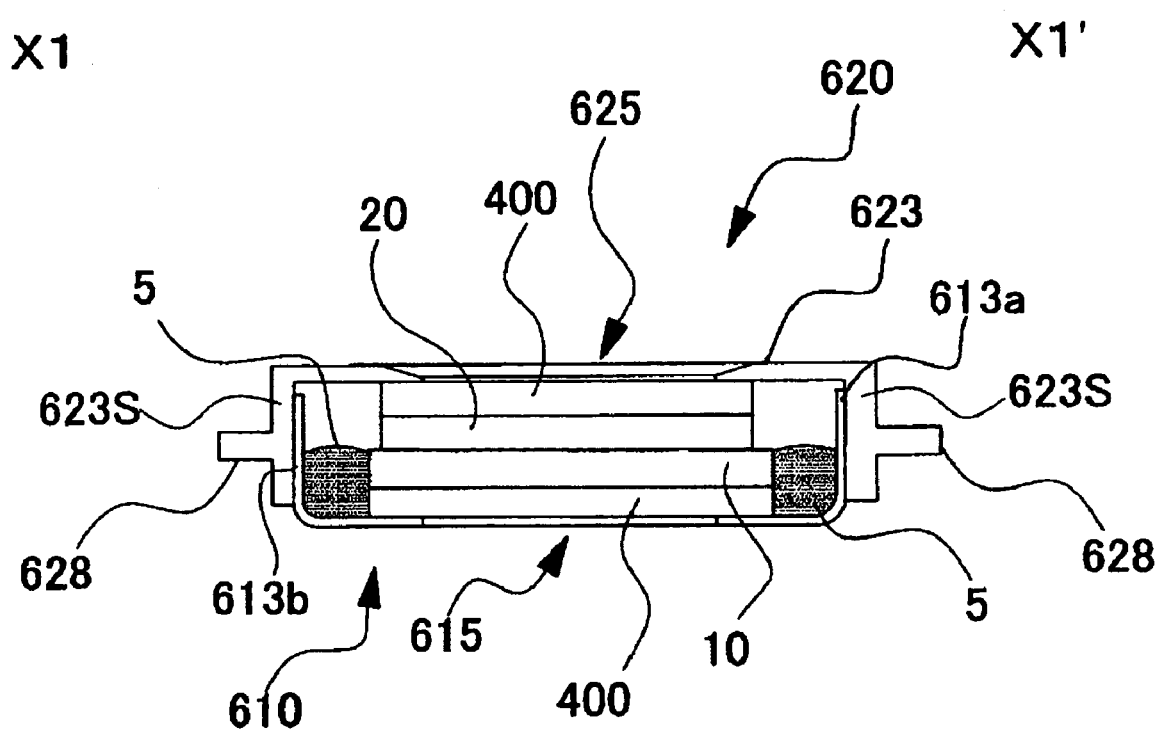
FIG. 7 is a cross-sectional view taken along the line X1–X1' in FIG. 5.
Figure 8:
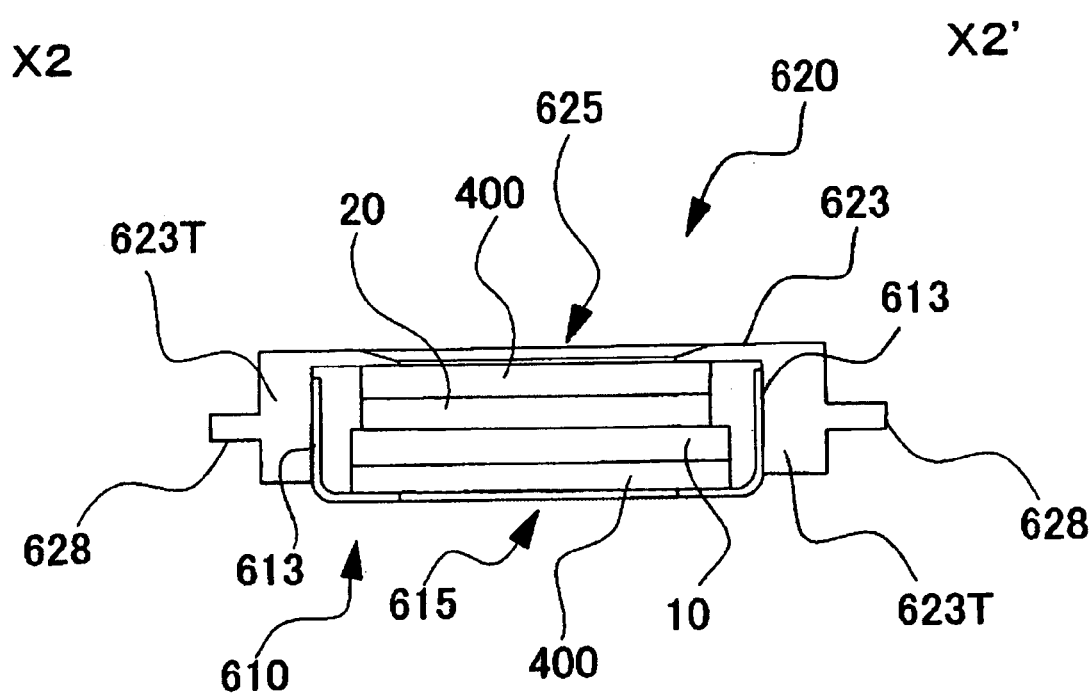
FIG. 8 is a cross-sectional view taken along the line X2–X2' in FIG. 5.

Next, an electro-optical device encased in a mounting case according to an embodiment of the present invention will be described with reference to FIGS. 4 to 8. Herein, FIG. 4 is an exploded perspective view illustrating an electro-optical device together with a mounting case according to the present embodiment, FIG. 5 is a front view of the electro-optical device encased in the mounting case, FIG. 6 is a back view thereof, FIG. 7 is a cross-sectional view taken along the line X1–X1' of FIG. 5, and FIG. 8 is a cross-sectional view shown from the line X2–X2' in FIG. 5. FIGS. 4 to 8 illustrate the mounting case in which electro-optical panels are accommodated, respectively. Further, in FIG. 5, a part of a cover member 620 to be described later is cut by the line C1–C1', and a plate member 610 to be described later, which faces the cover member in this figure, is shown.

As shown in FIGS. 4 to 8, the mounting case 601 comprises the plate member 610 and the cover member 620. The electro-optical device 500, which is accommodated within the mounting case 601, can include the electro-optical devices shown in FIGS. 2 and 3, and other optical components such as a reflection preventing plate overlapped with the surface thereof and a flexible connector 501 is connected to an external circuit connecting terminal. Furthermore, a polarizing plate or a retardation plate may be provided for the optical system of liquid crystal projector 1100, or may be overlapped on the surface of the electro-optical device 500. Moreover, a dustproof substrate 400 is provided on the TFT array substrate 10 and the counter substrate 20 at their sides not facing the liquid crystal layers 50 (see FIG. 4, etc.). The dustproof substrate prevents dirt or dust around the electro-optical device 500 from directly attaching to the surface of the electro-optical device. Therefore, it is possible to effectively remove a defect that a figure of dirt or dust appears on the magnified projection image (a defocusing effect).

According to this embodiment, light is incident from the cover member 620 side, passes through the electro-optical device 500, and is emitted from the plate member 610 side. That is, in FIG. 1, what faces the dichroic prism 1112 is not the cover member 620 but the plate member 610.

The construction of the plate member 610 and the cover member 620 constituting the mounting case 601 will be described below in greater detail.

Firstly, as shown in FIG. 4, the plate member 610 is a member having a substantially quadrilateral shape in plan view and is disposed to face one surface of the electro-optical device 500. In this embodiment, the plate member 610 and the electro-optical device 500 are directly abutted against each other, and the latter is mounted on the former.

More specifically, the plate member 610 can include a window 615, bent portions 613, and attaching holes 611. The window 615 is an opening formed in a part of the substantially quadrilateral plate member, and is a member enabling light to transmit, for example, from the upper side to the lower side in FIG. 4. The light transmitted from the electro-optical device 500 can be emitted through the window 615. As a result, when the electro-optical device 500 is mounted on the plate member 610, the peripheral region around the image display region 10a in the electro-optical device 500 is in a state abutting against the edge of the window 615. In this manner, the plate member 610 holds the electro-optical device 500. Further, since the electro-optical device 500 contacts with the edge of the window 615, heat is smoothly transmitted from the former to the latter.

The bent portions 613 are portions formed by bending part of each of two opposite sides of the substantially quadrilateral plate member toward the inside of the quadrilateral shape. The outer surfaces of the bent portions 613 are abutted against the inner surface of the cover member 620 when bonding the plate member 610 to the cover member 620 (see FIG. 7). Therefore, the heat transmitted from the electro-optical device 500 to the plate member 610 can be transmitted to the cover member 620 through the bent portions 613. Further, in this embodiment, particularly, the bent portions 613 have adhesive pockets 613a, 613b, 613c, and 613d formed therein, which will be described later.

The attaching holes 611a to 611d are used for attaching the electro-optical device encased in the mounting case to the inside of the liquid crystal projector 1100 as illustrated in FIG. 1. According to the present embodiment, the attaching holes 611a to 611d are provided at the four corners of the substantially quadrangular plate member. According to the present embodiment, in addition to the attaching holes 611a to 611d, an attaching hole 611e is provided. The attaching hole 611e is arranged so as to form a triangle together with the attaching holes 611c and 611d among the attaching holes 611a to 611d (that is, the attaching holes 611e, 611c, and 611d are formed to be arranged at the apexes of the triangle). Therefore, according to the present embodiment, it is possible to carry out a four-point fixing using the attaching holes 611a to 611d at the four corners and also to carry out a three-point fixing using the attaching holes 611e, 611c, and 611d.

Secondly, the cover member 620, as shown in FIG. 4 to FIG. 8, is a substantially hexahedral member, and is arranged to face the surface of the electro-optical device 500 opposite to the surface facing the plate member 610.

The cover member 620 is preferably made of light shielding resin, metallic material, or the like in order to prevent the leakage of the light in the peripheral region of the electro-optical device 500 as well as the introduction of stray light from the peripheral region to the image display region 10a. Since it is preferable that the cover member 620 functions as a heat sink for the plate member 610 or the electro-optical device 500, the cover member 620 is preferably made of materials of relatively high heat conductivity, such as aluminum, magnesium, copper, or an alloy thereof.

More specifically, the cover member 620 can include a cooling air introducing portion 622, a cooling air discharging portion 624, and a cover main body 623.

As shown in FIGS. 4 to 8, the cover main body 623 is a member having substantially a rectangular parallelepiped shape, and is interposed between the cooling air introducing portion 622 and the cooling air discharging portion 624, which will be described below. However, the inside of the rectangular parallelepiped is in a so-called hollow state in order to accommodate the electro-optical device 500 therein. That is, the cover main body 623 is a coverless box-shaped member (according to such an expression, 'the cover' mentioned here corresponds to the plate member 610.).

More specifically, the cover main body 623 has a window 625, side fin portions 628, and protrusions 623T. The window 625 is formed in the bottom surface (the top surface in FIG. 4, etc.) of the box-shaped member as an opening, and transmits light from the top to the bottom in FIG. 7. The light emitted from the lamp unit 1102 within the liquid crystal projector 1100 shown in FIG. 1 can be incident onto the electro-optical device 500 through the window 625. The edge of the window 625 abuts the peripheral region of the electro-optical device 500 like as the edge of the window 615 of the plate member 610. Therefore, the heat is smoothly transmitted from the electro-optical device 500 to the cover member 620.

On the other hand, the side fin portions 628 are formed at both sides of the cover main body 623. Here, the both sides indicate the sides where the cooling air introducing portion 622 and the cooling air discharging portion 624, which will be described later, do not exist. More specifically, as shown in FIG. 4, etc., in the side fin portions 628, portions straightly protruding from the side are arranged zigzag from the cooling air introducing portion 622, toward the cooling air discharging portion 624. In this regard, the surface areas of the cover main body 623 and the cover member 620 increases.

According to the present embodiment, in particular, the protrusions 623T are included in the cover main body 623 as illustrated in FIG. 5, which will be described later.

Moreover, as already described, the inner surface of the cover member 620 is abutted against the outer surfaces of the bent portions 613 of the plate member 610 in assembling the cover member 620 and the plate member 610 together (see FIG. 7). Therefore, the heat of the electro-optical device 500 is effectively transmitted to the plate member 610, the bent portions 613, and the cover member 620.

As illustrated in FIG. 4, the cooling air introducing portion 622 can include a tapered portion 622T. According to the present embodiment, the tapered portion 622T looks like a column whose bottom surface is trapezoidal. One side surface of the column is attached to one surface of the cover main body 623. Therefore, the tapered portion 622T has a base portion that is the highest on the side surface of the cover main body 623 and has a tip portion whose height is gradually reduced from the base portion. A notched portion is formed in the tip portion so as to correspond to the attaching hole 611e.

Finally, as well illustrated in FIG. 4, etc., the cooling air discharging portion 624 is constituted of a rear fin portion 624F. To be specific, the rear fin portion 624F has a plurality (four straight protrusion portions are arranged parallel to each other in FIG. 4, etc.) of straightly protruding portions, which are arranged parallel to each other so as to correspond to the extending direction of the zigzag side fin portions 628 as mentioned above. Therefore, the surface area of the cover member 620 is increased.

Figure 9:
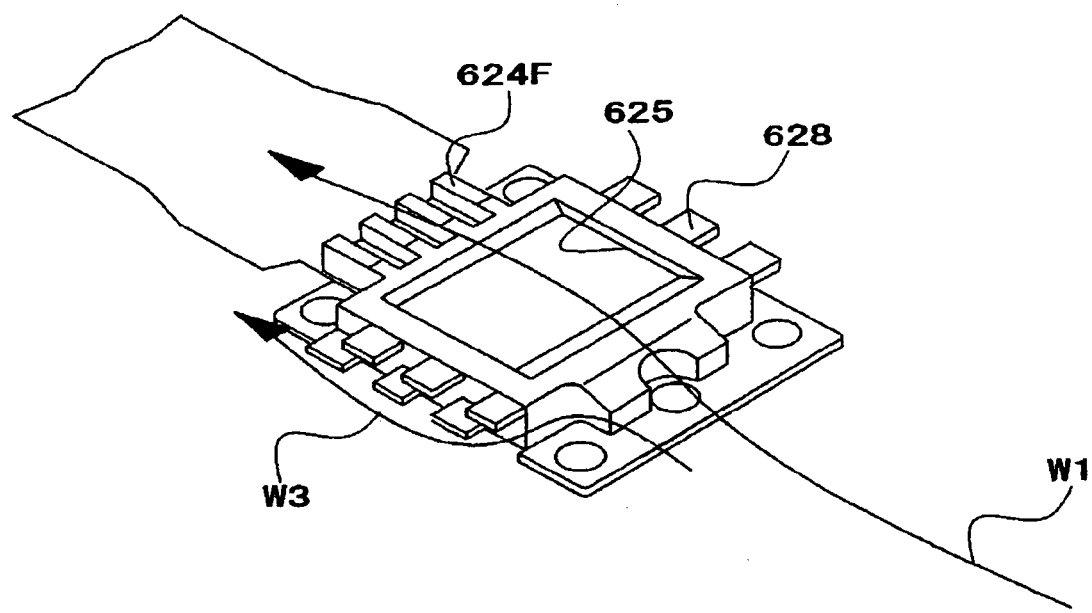
FIG. 9 is a perspective view of the electro-optical device encased in the mounting case and illustrates the typical flowing of wind with respect to the electro-optical device encased in the mounting case.

Since the cover member 620 has the aforementioned construction, the wind supplied from the sirocco fan 1300 provided in the liquid crystal projector 1100 as showed in FIG. 1 blows into the mounting case 601 or the cover member 620, as shown in FIG. 9. Here, FIG. 9 is a perspective view of an electro-optical device encased in the mounting case and illustrates the typical blowing direction of wind into the electro-optical device encased in the mounting case. In addition, in the liquid crystal projector 1100 shown in FIG. 1, in order to implement the blow of the cooling air as shown in FIG. 9, it is necessary to arrange the electro-optical device encased in the mounting case, that is, light valves 100R, 100G, and 100B such that the outlets 100RW, 100GW, and 100BW described above with reference to FIG. 1 face the cooling air introducing portion 622 constituting the cover member 620.

The cooling air flows into the cover main body 623 through which the surface of the electro-optical device 500 is exposed (refer to the reference numeral W1) as if jumping over the tapered portion 622T of the cooling air introducing portion 622. Therefore, according to the present embodiment, it is possible to effectively send the air toward the cover main body 623, to directly deprive the electro-optical device 500 of the heat generated by the electro-optical device 500 (that is, to cool the electro-optical device 500), and to effectively deprive the cover member 620 of the heat accumulated in the cover member 620.

The air (refer to the reference numeral W3) that reaches the external of the cooling air introducing portion 622 and the air that reaches the surface and the periphery of the electro-optical device 500 as mentioned above and then flows toward the sides of the cover main body 623 reach the side fin portions 628. As mentioned above, since the side fin portions 628 have zigzag fins and the surface area of the cover main body 623 is increased, it is possible to effectively cool the cover main body 623 and the cover member 620.

As mentioned above, the air that reaches the surface and the periphery of the electro-optical device 500 and then flows to the rear end of the cover main body 623 reaches the rear fin portion 624F (refer to the reference numeral W1). As mentioned above, since the rear fin portion 624F has straight protrusions and the area of the cooling air discharging portion 624 is increased, it is possible to effectively cool the cooling air discharging portion 624 and the cover member 620.

As mentioned above, the mounting case 601 according to the present embodiment can be effectively cooled by the cooling air. It is very effective for finally radiating the heat transmitted to the electro-optical device 500, the plate member 610, and the cover member 620 in this order as mentioned above to the outside. That the cover member 620 is effectively cooled means that the transmission of the heat can be always effectively performed from the electro-optical device 500 to the plate member 610 or the cover member 620 through the bent portions 613 and others. That is, since the cover member 620 is always appropriately cooled, the cover member 620 can keep the function of the heat sink effectively to thus deprive the plate member 610, furthermore, the electro-optical device 500 of the heat.

Therefore, as described above, according to this embodiment, since the heat is not excessively accumulated in the electro-optical device 500, the deterioration of the liquid crystal layers 50 and the generation of the hot spots can be prevented. Thus, the possibility of causing deterioration of images can be greatly reduced.

The structures and the effects of the adhesive pockets 613a to 613d of the plate member 610 and the protrusions 623T of the cover member 620, which are features of the present embodiment, will now be described.

As illustrated in FIGS. 4 to 7, the adhesive pockets 613a to 613d are formed of the outwardly protruding parts of the bent portions 613. To be specific, the adhesive pockets 613b and 613d are formed in the bent portion 613 on the left of FIG. 5, while the adhesive pockets 613a and 613c (refer to FIG. 4) are formed in the bent portion 613 marked with a dashed line on the right of FIG. 5. Thus, according to the present embodiment, the adhesive pockets 613a to 613d are formed so as to correspond to the four corners of the electro-optical device 500.

The portions corresponding to the pockets in the adhesive pockets 613a, 613b, 613c, and 613d coincide with the internal portions of the protruding portions. An adhesive 5 is filled in the corresponding portions. The plate member 610 is attached to the electro-optical device 500 by the adhesive 5. A photo-curing resin is preferably used as the adhesive 5. Therefore, it is possible to obtain strong adhesive strength and to easily manage the adhesive.

On the other hand, as illustrated in FIG. 6, the protrusions 623T are formed on the internal surface of the cover main body 623 so as to face the both sides of the electro-optical device 500 in the drawing. The protrusions 623T are configured to be able to engage with the adhesive pockets 613a to 613d. That is, the protrusion 623T on the left of FIG. 6 is configured to be engaged between the adhesive pockets 613a and 613c. The protrusion 623T on the right of FIG. 6 is configured to be engaged between the adhesive pockets 613b and 613d. Therefore, the relative position of the cover member 620 with respect to the plate member 610 is fixed by the protrusions 623T. Thus, in the adhesive pockets 613a to 613d, the external portions of the protruding portions constitute the engaging portions with respect to the protrusions 623T. That is, according to the present embodiment, the adhesive pockets 613a to 613d have both the functions as the engaging portions with respect to the protrusions 623T of the cover member 620 and as the pockets for accommodating the adhesive.

According to the above-mentioned structure, it is possible to obtain the following effects by the mounting case 601 according to the present embodiment. That is, first, since the adhesive pockets 613a, 613b, 613c, and 613d are formed, it is possible to prevent the adhesive 5 to be used from being wasted. As illustrated in FIG. 5, when the sizes or the volumes of the adhesive pockets 613a, 613b, 613c, and 613d are appropriately determined, it is possible to achieve more reliable attachment of the plate member 610 to the electro-optical device 500 only by coating the internal portions of the adhesive pockets with the adhesive. Therefore, according to the present embodiment, when the temperature of the electro-optical device encased in the mounting case rises, the possibility of dislocation in position of the electro-optical device 500 within the mounting case 601 can be greatly reduced.

Second, as illustrated in FIG. 5, the adhesive pockets 613a, 613b, 613c, and 613d according to the present embodiment are formed so as to be engaged with the protrusions 623T of the cover member 620. When observing the engagement of the adhesive pockets 613a and 613c with the protrusions 623T in more detail, as illustrated in FIGS. 7 and 8, excluding that the protrusions 623T are engaged between the adhesive pockets 613b and 613d and between the adhesive pockets 613a and 613c, the side walls 623S positioned on both sides with the protrusions 623T interposed therebetween are not restricted. That is, the cover member 620 has its position determined only by the protrusions 623T and can freely expand or contract in other portions.

Figure 10:
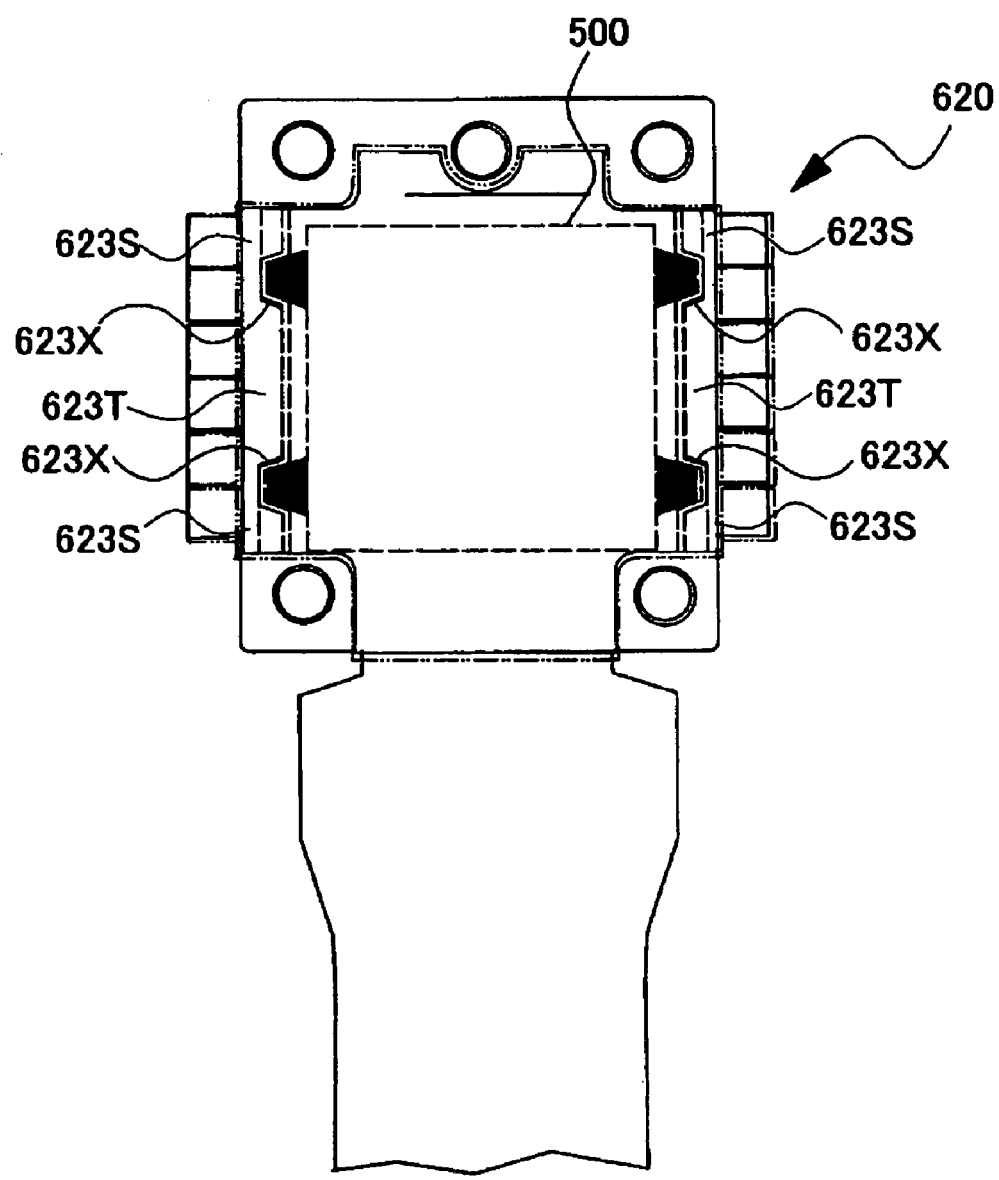
FIG. 10 is a view having the same purpose as FIG. 5 and illustrating the deformation of a cover member on the basis of protrusions.

Therefore, the thermal expansion of the cover member 620, which occurs when the projection light incident onto the electro-optical device encased in the mounting case results in the rise in temperature of the cover member 620 or when transmission of heat from the electro-optical device 500 results in the rise in temperature of the cover member 620, can be relatively freely performed without any restriction, as illustrated by the dotted lines of FIG. 10. Also, the contraction of the cover member 620, which occurs when the cover member 620 is cooled after the temperature thereof has risen, can be relatively freely performed. FIG. 10 is a view having the same purpose as FIG. 5 and illustrating the deformation of the cover member 620 on the basis of the protrusions 623T. As illustrated in FIG. 10, since the cover member 620 is restricted by the portions in which the side walls of the protrusions 623, which are denoted by the reference numeral 623X, contact the side walls of the adhesive pockets 613a to 613d, it is possible to prevent the cover member 620 from deforming without restriction. At the same time, since the cover member 620 is actually restricted only in these portions, the cover member 620 can relatively freely deform.

Therefore, according to the present embodiment, it is possible to prevent the dislocation in position of the electro-optical device 500 in the mounting case 601 due to the expansion of the cover member 620 and to prevent color irregularity in images due to power applied to the electro-optical device 500 by the contraction of the cover member 620.

Third, according to the present embodiment, since the adhesive pockets 613a to 613d have the functions as the pockets for accommodating the adhesive 5 and as the engaging portions for restricting the cover member 620, it is possible to simplify the structure of the electro-optical device compared with a structure in which the above-mentioned functions are separately realized.

It should be understood that the invention is not limited to the aforementioned embodiments, but it can be modified without departing from the scope and spirit of the present invention obtained by the claims and the teachings of the specification and the accompanying drawings. The modified electro-optical device encased in the mounting cases, projection display apparatuses, and mounting cases are also included in the technical scope of the invention. The invention can be applied to an electrophoreses device or an electroluminescent device, in addition to the liquid crystal panel, as the electro-optical device.

What is claimed is:

1. An electro-optical device comprising:
   an electro-optical panel;
   a plate that faces one surface of the electro-optical panel;
   a cover that covers the plate and the electro-optical panel; and
   at least one adhesive that attaches the plate to the electro-optical panel, the plate including at least one bent portion with a surface that confronts a side surface of the electro-optical panel, the bent portion connecting at least one concave adhesive pocket, which is bent away from the side surface of the electro-optical panel.

2. The electro-optical device according to claim 1, the plate including a flat portion that is quadrangular in plan view and the at least one bent portion, which is located on a side of the flat portion, and
   the adhesive pocket protruding toward an outside of the flat portion.

3. The electro-optical device according to claim 2,
   two of the adhesive pockets being provided on both sides of the bent portion.

4. The electro-optical device according to claim 1, the adhesive comprising a photo-curing resin.

5. A projection type display device, comprising:
   the electro-optical device according to claim 1;
   a light source that emits light;

an optical system that guides light onto the electro-optical device; and a projection optical system that projects the light emitted from the electro-optical device.

6. The electro-optical device according to claim 1, wherein the adhesive attaches the plate to a side surface of the electro-optical panel, two of the adhesive pockets being provided on the plate at positions facing opposite side surfaces of the electro-optical panel, the adhesive pockets being open at a side of the plate that faces the cover.

7. A mounting case for accommodating an electro-optical panel having an image display region on which projection light from a light source is incident, the mounting case comprising:

a plate that faces one surface of the electro-optical panel;
a cover that covers the plate and the electro-optical panel;
a plate that faces one surface of the electro-optical panel;
a cover that covers the plate and the electro-optical panel;
at least one adhesive that attaches the plate to the electro-optical panel; and
adhesive pockets that accommodate the adhesive, which are provided on both sides of the plate.
at least one adhesive that attaches the plate to the electro-optical panel; and
adhesive pockets that accommodate the adhesive, which are provided on both sides of the plate.

8. An electro-optical device comprising:

an electro-optical panel having two broad surfaces on opposite sides thereof and a side surface extending substantially perpendicular to at least one of the broad surfaces;

a plate including a side surface that confronts the side surface of the electro-optical panel, the side surface including an inner side surface facing the side surface of the electro-optical panel and an outer side surface facing away from the side surface of the electro-optical panel, the inner side surface including a concave adhesive pocket that recedes away from the side surface of the electro-optical panel compared with other portions of the inner side surface;

a cover having a portion that confronts the outer side surface of the plate; and adhesive that attaches the plate to the electro-optical panel, a portion of the adhesive being located in the concave adhesive pocket.

* * * * *